United States Patent
Mao et al.

(10) Patent No.: US 8,801,944 B2
(45) Date of Patent: Aug. 12, 2014

(54) METHOD FOR MANUFACTURING A MAGNETIC WRITE HEAD USING NOVEL MASK STRUCTURE

(71) Applicant: HGST Netherlands B.V., Amsterdam (NL)

(72) Inventors: Guomin Mao, San Jose, CA (US); Yi Zheng, San Ramon, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/687,986

(22) Filed: Nov. 28, 2012

(65) Prior Publication Data

US 2014/0144872 A1   May 29, 2014

(51) Int. Cl.
*B44C 1/22* (2006.01)

(52) U.S. Cl.
USPC ............... 216/22; 216/41; 216/47; 216/51; 216/66; 216/67; 438/3; 438/712; 438/717; 29/603.07

(58) Field of Classification Search
None
See application file for complete search history.

(56) References Cited

U.S. PATENT DOCUMENTS

| | | | |
|---|---|---|---|
| 7,085,100 B2 | 8/2006 | Harris, III et al. | |
| 7,120,988 B2 | 10/2006 | Le et al. | |
| 7,381,343 B2 | 6/2008 | Gaidis et al. | |
| 7,565,732 B2 | 7/2009 | Le et al. | |
| 7,587,810 B2 | 9/2009 | Le | |
| 8,014,104 B2 | 9/2011 | Cheng et al. | |
| 2006/0231523 A1* | 10/2006 | Baer et al. | 216/22 |
| 2007/0010043 A1* | 1/2007 | Pinarbasi | 438/105 |
| 2007/0109683 A1* | 5/2007 | Kawai et al. | 360/126 |
| 2008/0148552 A1* | 6/2008 | Pentek et al. | 29/603.01 |
| 2009/0236307 A1* | 9/2009 | Okada et al. | 216/22 |
| 2010/0128392 A1* | 5/2010 | Bonhote et al. | 360/125.03 |

OTHER PUBLICATIONS

Moyer et al., "Silicon-Containing Materials for Sub-65 nm Etch," Semiconductor International, Sep. 2007, pp. 1-4.

* cited by examiner

*Primary Examiner* — Lan Vinh
*Assistant Examiner* — Jiong-Ping Lu
(74) *Attorney, Agent, or Firm* — Zilka-Kotab, PC

(57) ABSTRACT

A method for manufacturing a magnetic write pole of a magnetic write head that achieves improved write pole definition reduced manufacturing cost and improves ease of photoresist mask re-work. The method includes the use of a novel bi-layer hard mask beneath a photoresist mask. The bi-layer mask includes a layer of silicon dielectric, and a layer of carbon over the layer of silicon dielectric. The carbon layer acts as an anti-reflective coating layer that is unaffected by the photolithographic patterning process used to pattern the write pole and also acts as an adhesion layer for resist patterning. In the event that the photoresist patterning is not within specs and a mask re-work must be performed, the bi-layer mask can remain intact and need not be removed and re-deposited. In addition, the low cost and ease of use silicon dielectric and carbon reduce manufacturing cost and increase throughput.

14 Claims, 15 Drawing Sheets

METHOD FOR MANUFACTURING A MAGNETIC WRITE HEAD USING NOVEL MASK STRUCTURE

FIELD OF THE INVENTION

The present invention relates to magnetic data recording and more particularly to an improved method for manufacturing a magnetic write pole of a magnetic write head.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

In order to increase data density it is necessary to decrease the track width and bit length of the data recording system. With regard to the write head, this requires that the write pole be manufactured very accurately and with very small dimensions. In addition, the extremely competitive nature of the data storage industry demands that manufacturing processes be as cost effective and efficient as possible. Therefore, there remains an ever increasing need for improved manufacturing processes for constructing magnetic write heads for recording at ever increased resolution.

SUMMARY OF THE INVENTION

The present invention provides a method for manufacturing a magnetic write head that includes, depositing a layer of write pole material and then depositing a series of mask layers over the write pole material. The series of mask layers includes: an under-layer; a bi-layer hard mask structure formed over the under-layer and a layer of photoresist formed over the bi-layer hard mask structure. The bi-layer hard mask structure includes a layer of silicon dielectric (such as silicon oxide, silicon nitride, silicon carbide, silicon oxynitride, poly-silicon or amorphous silicon) and a layer of carbon formed over the layer of silicon dielectric. The photoresist layer is photolithographically patterned to form a photoresist mask. Then, a first reactive ion etching (RIE) is performed to remove portions of the bi-layer hard mask structure that are not protected by the photoresist mask, thereby transferring the photoresist mask pattern onto the bi-layer mask structure. Then, a second RIE is performed to remove portions of the underlayer that are not protected by the bi-layer hard mask to transfer the bi-layer hard mask pattern onto the underlayer. Then, an ion milling is performed to remove a portion of the magnetic write pole layer that is not protected by the underlayer to define a write pole.

The use of the novel bi-layer hard mask advantageously reduces manufacturing cost while improving manufacturing throughput. The carbon layer of the bi-layer hard mask structure acts as an effective anti-reflective coating and also as an adhesion layer for the photoresist. In addition, the silicon dielectric and carbon are readily available, inexpensive materials, which reduce cost over the use of other bottom anti-reflective coating (BARC) materials or silicon containing polymers such as SIHM® (Shin-Etsu Chemical Co., Ltd.), UVAS® (Honeywell International Inc.), etc.

In addition, the use of the novel bi-layer hard mask greatly facilitates photo mask re-work. In the event that the patterning of the photoresist mask is not within specification, the photoresist mask must be removed, replaced and the photolithographic patterning repeated. The novel bi-layer hard mask is, however, unaffected by the photolithographic patterning process and, therefore, need not be removed and replaced prior to the photo re-work. This provides a great advantage over the use of other anti-reflective and hard mask materials, which required the removal and replacement of all mask layers prior to re-work.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
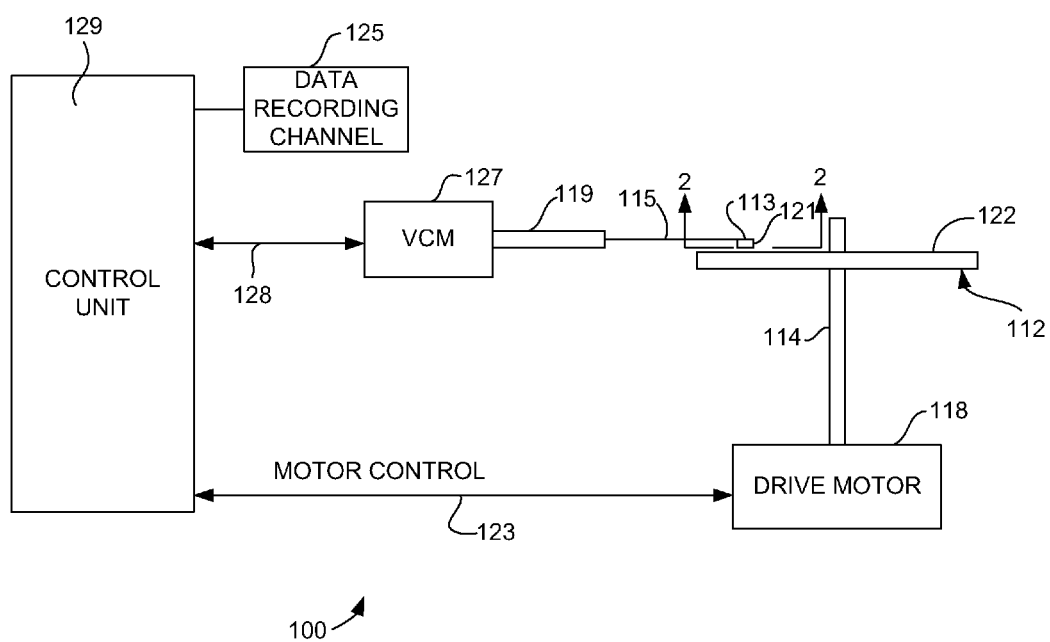
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
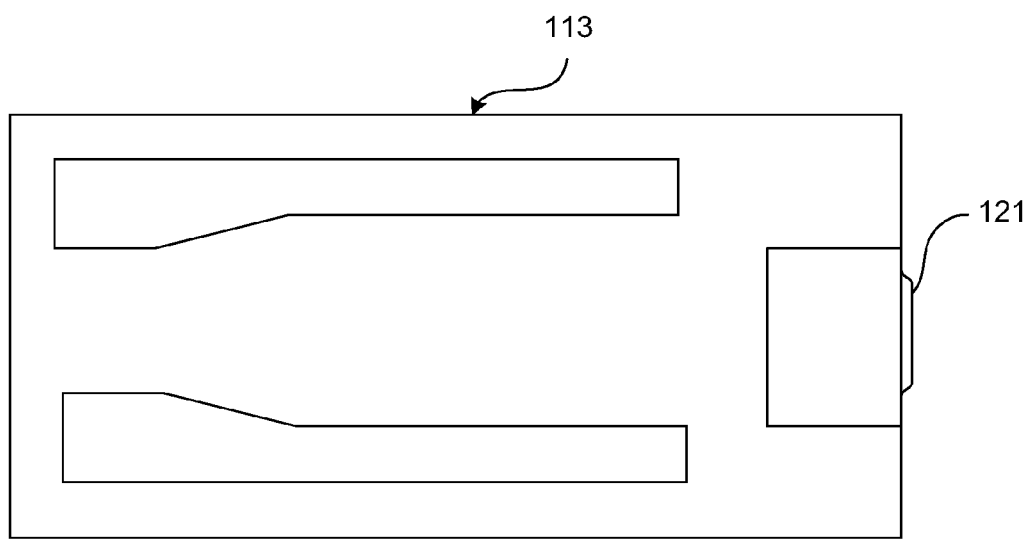
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
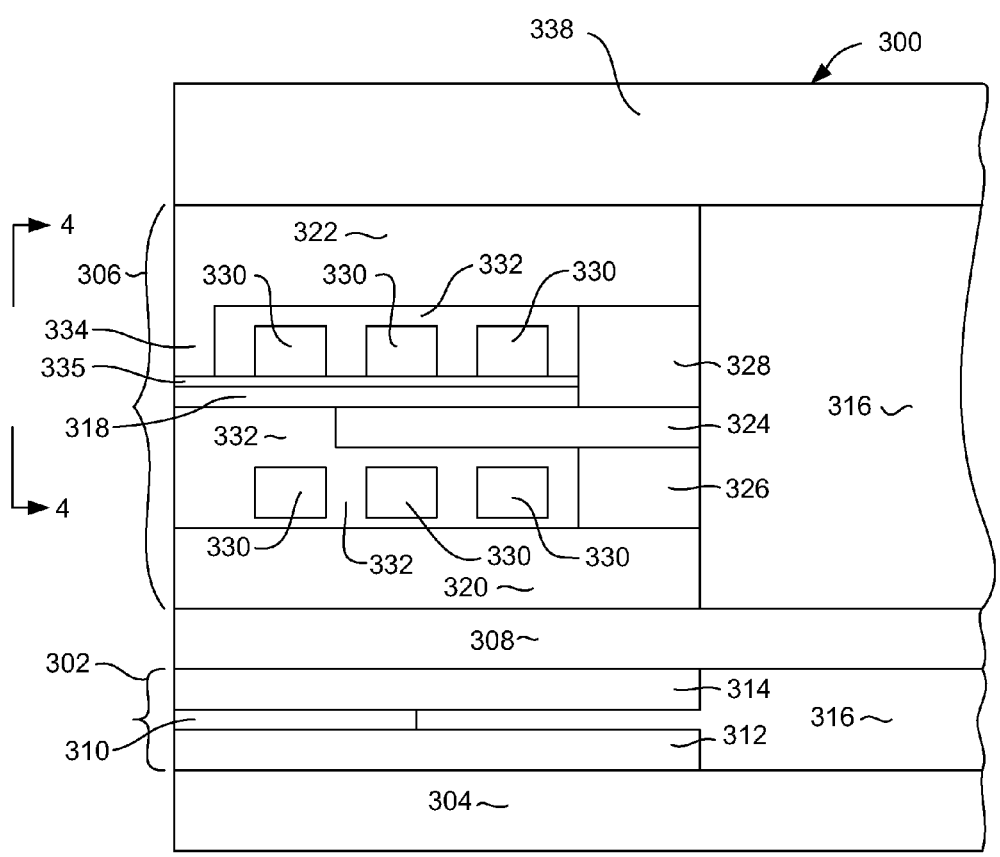
FIG. 3 is a side cross sectional view of a magnetic head according to an embodiment of the invention.

FIG. 3 shows a side, cross sectional view of magnetic head 300 according to a possible embodiment of the invention. The magnetic head 300 includes a read head 302 formed on a slider body substrate 304, and a write head 306 formed over the read head 302. The read head 302 and write head 306 may be separated by a non-magnetic spacer layer 308 such as alumina. The read head 302 can include a magnetoresistive sensor element 310 sandwiched between first and second magnetic shields 312, 314, all of which can be encased in a non-magnetic electrically insulating fill layer 316 such as alumina.

The write head 306 includes a magnetic write pole 318, a leading magnetic return pole 320, and may include a trailing return pole 322. The write pole 318 can be magnetically connected with a magnetic shaping layer 324 that helps to conduct magnetic flux to the write pole. The write pole 318 and shaping layer 324 can be magnetically connected with the return poles 320, 322 by magnetic back gap structures 326, 328. The write head 306 also includes a non-magnetic, electrically conductive write coil 330, which can be constructed of a material such as Cu and which is shown in cross section in FIG. 3. The write coil 330 can be embedded in one or more non-magnetic insulation layers 332 which can be a material such as alumina and/or hard baked photoresist.

When an electrical current flows through the write coil 330, a resulting magnetic field causes a magnetic flux to flow through the magnetic layers 320, 326, 324, 328, 322, 318. This causes a write field to be emitted from the tip of the write pole 318 at the ABS, which can write a bit of data to an adjacent magnetic medium (not shown in FIG. 3). A magnetic trailing shield 334 can be provided adjacent to the trailing edge of the write pole 318 and can be connected with the trailing return pole 322 as shown in FIG. 3. The magnetic shield 334 is separated from the trailing edge of the write pole 318 by a non-magnetic trailing gap layer 335. This trailing magnetic shield 334 increases the field gradient of the write field being emitted from the write pole 318. This results in improved magnetic switching during writing of data. A protective layer 338 may be provided over the top of the write head 306. The protective layer can be a material such as alumina and helps to protect the read and write heads 302, 306 from damage such as from corrosion or physical wear.

Figure 4:
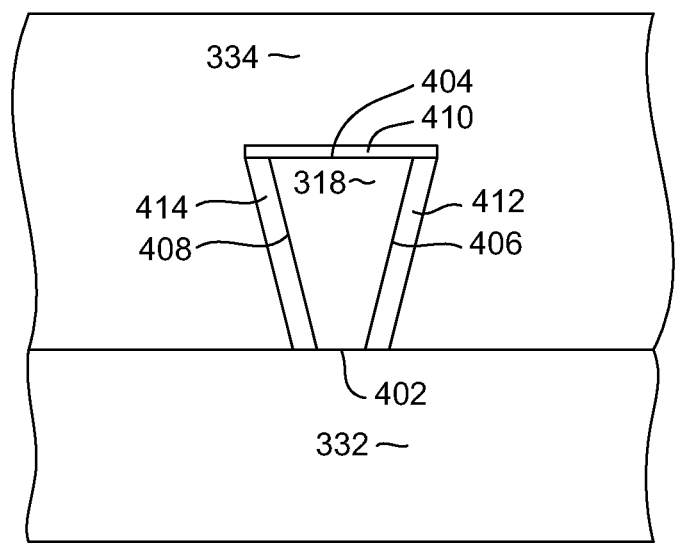
FIG. 4 is an enlarged ABS view of a portion of the magnetic write head of FIG. 3.

FIG. 4 is an enlarged ABS view of a portion of the write head 306 as seen from line 4-4 of FIG. 3. As seen in FIG. 4, the write pole 318 has a pole tip that preferably has a tapered trapezoidal shape, having a leading edge 402, a trailing edge 404, and tapered sides 406, 408. At very narrow track widths, the narrower leading edge 402 can actually come to a point so that the write pole 318 has a triangular shape rather than a trapezoidal shape.

Also as seen in FIG. 4, the shield 334 can be formed to have side portions that wrap around the write pole 318 to provide a side shielding as well as functioning as a trailing shield. The trailing edge of the write pole 318 can be separated from the trailing shield 334 by a non-magnetic trailing gap layer 404. Also, the sides 406, 408 of the write pole 318 can be separated from the side portions of the trailing shield 334 by non-magnetic side gap layers 412, 414.

Figure 5:
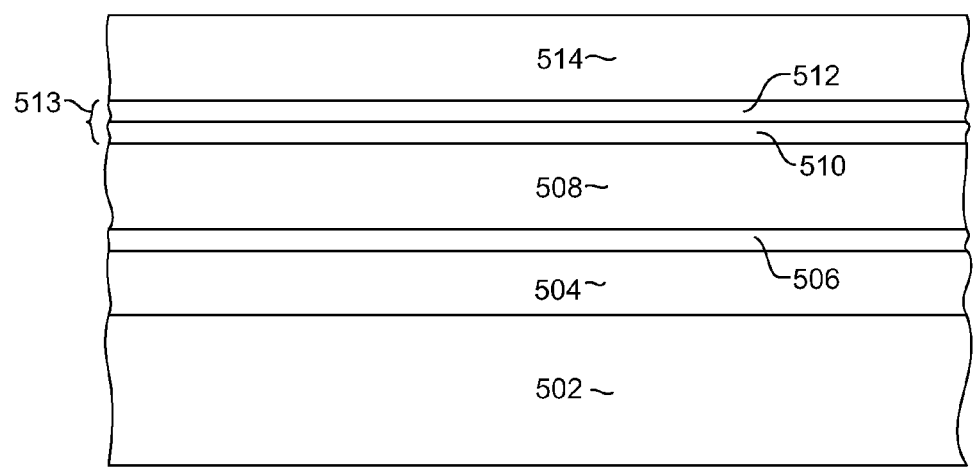
FIGS. 5-12 are views of a magnetic write head in various intermediate stages of manufacture, illustrating a method for manufacturing a magnetic write head according to an embodiment of the invention.
Figure 6:
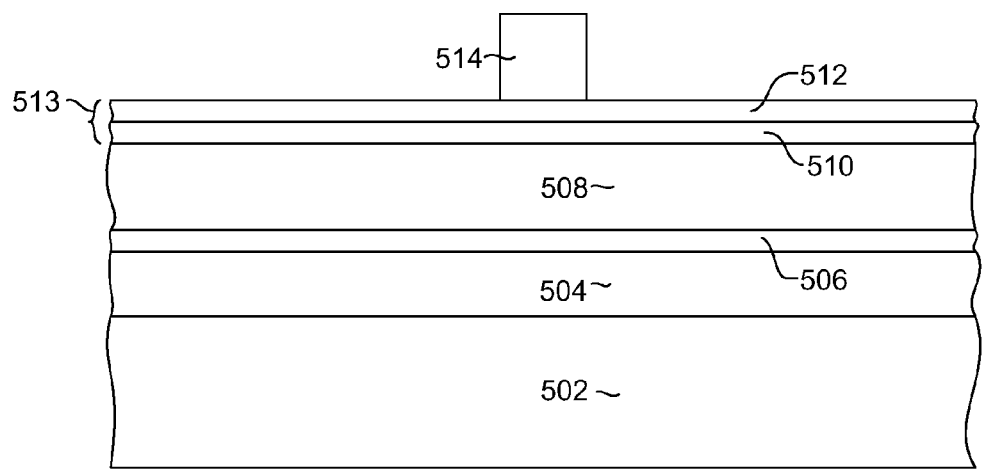

FIGS. 5-12 show a magnetic write head in various intermediate stages of manufacture in order to illustrate a method of manufacturing a magnetic write head according to an embodiment of the invention. With particular reference to FIG. 5, a substrate 502 is formed, having a planar upper surface. The substrate 502 can include the non-magnetic fill layer 328, and shaping layer 324 described above with reference to FIG. 3. A magnetic write pole material 504 is then deposited over the substrate 502. The write pole material 504 preferably includes layers of a magnetic material such as CoFe separated by thin layers of non-magnetic material such as alumina (not shown), and can therefore be referred to as a lamination layer 504. A first, or lower, hard mask layer 506 can be deposited over the write pole material layer 504. The hard mask layer 506 can be constructed of a material such as alumina or diamond like carbon (DLC).

Then, a mask under-layer 508 is deposited over the first hard mask 506. The under-layer 508 can be formed of a polymeric material such as SIUL® (Shin-Etsu Chemical Co., Ltd.), DURIMIDE® (Fujifilm Corporation), JSR HM8006® (Honeywell International Inc.), ACCUFLO T-31® (Honeywell International Inc.), which all can be cured at a relatively low temperature, such as around 150 to 250 degrees C. The under-layer 508 acts as an image transfer layer to provide sufficient mask structure for defining a write pole while also facilitating mask liftoff.

Then, with continued reference to FIG. 5, a second, or upper, hard mask structure 513 is deposited. This second (or upper) hard mask structure 513 is a novel bi-layer structure that includes a first layer 510 of silicon dielectric (such as silicon oxide, silicon nitride, silicon carbide, silicon oxynitride, poly-silicon or amorphous silicon) and a second layer 512 of carbon deposited over the first layer 510. The silicon dielectric layer 510 can be deposited by sputter deposition or PECVD (plasma enhanced chemical vapor deposition) method. The layer of carbon 512 can be deposited by several methods including ion-beam deposition (IBD), physical vapor deposition (PVD), chemical vapor deposition (CVD), plasma enhanced chemical vapor deposition (PECVD) and spin coating of microelectronics-grade carbon nano-tube by Brewerscience®. The first layer 510 can be deposited to a thickness of 50 to 150 nm or about 100 nm. The second layer 512 can be deposited to a thickness of 2-10 nm or about 5 nm. This novel bi-layer hard mask structure 513 provides several advantages over prior art hard masks, which will be discussed in greater detail herein below.

With continued reference to FIG. 5, after depositing the bi-layer upper hard mask 513, a layer of resist material 514 is deposited. This can be a photoresist such as a 193 nm wavelength photoresist. Then, with reference to FIG. 6, the photoresist layer 514 is photolithographically patterned to define a photoresist mask structure 514 that is configured to define a write pole shape. The thin carbon hard mask layer 512 acts as an antireflective coating to improve the resolution and accuracy of the photolithographic patterning. The carbon layer 512 also acts as an adhesion layer for the photoresist 514.

Figure 7:
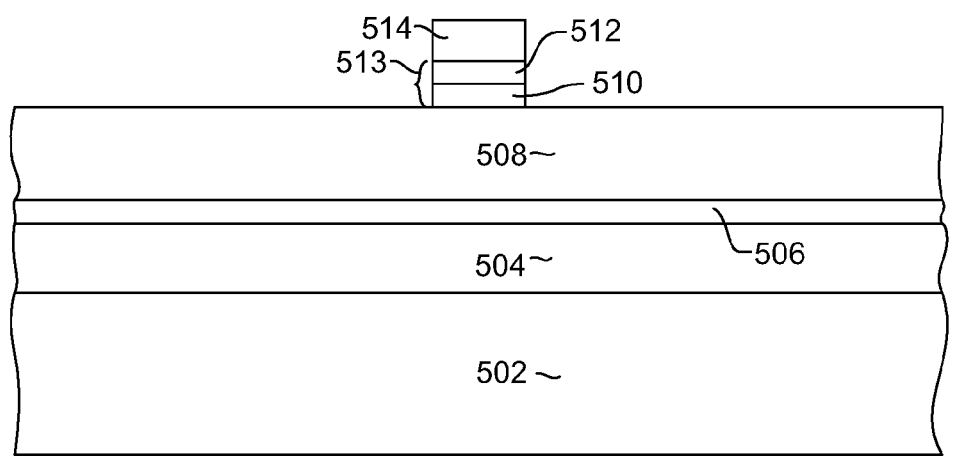
Figure 8:
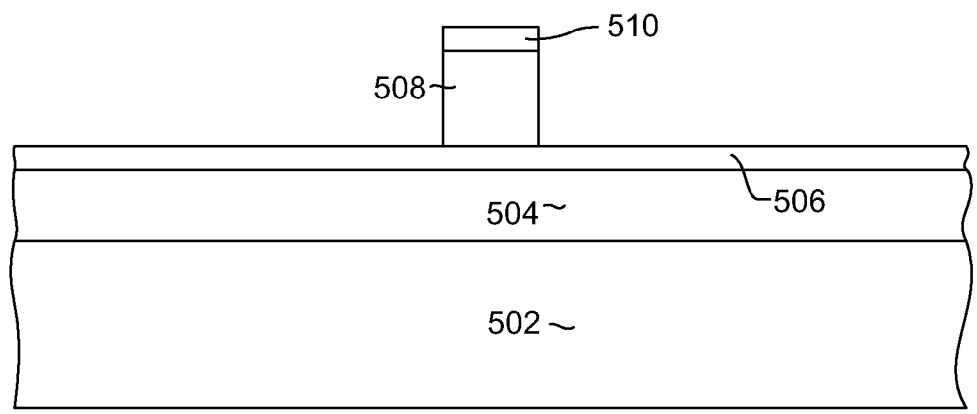

With reference now to FIG. 7, a reactive ion etching (the first RIE) is performed to remove portions of the carbon hard mask 510 and the silicon dielectric hard mask 512 that are not protected by the photoresist mask 514. This reactive ion etching can be performed in a fluorine based chemistry that preferably includes 4 gases: $CF_4$, $CHF_3$, $O_2$ and He. Then, with reference to FIG. 8, another reactive ion etching (the second RIE) is performed to remove portions of the under-layer mask layer 508 that are not protected by the patterned hard mask layers 510, 512. This second RIE can be performed in an oxygen based chemistry, preferably comprising mostly $CO_2$. This second RIE may remove all of the second layer 512 (FIG. 7) and portion of the dielectric hard mask layer 510, leaving a structure as shown in FIG. 8. The first and second RIE processes can be performed in a reactive ion etching tool such as a Plasma-Therm Versalock ICP® tool equipped with both source and bias power and OES (optical emission spectroscopy) endpoint detection system.

Figure 9:
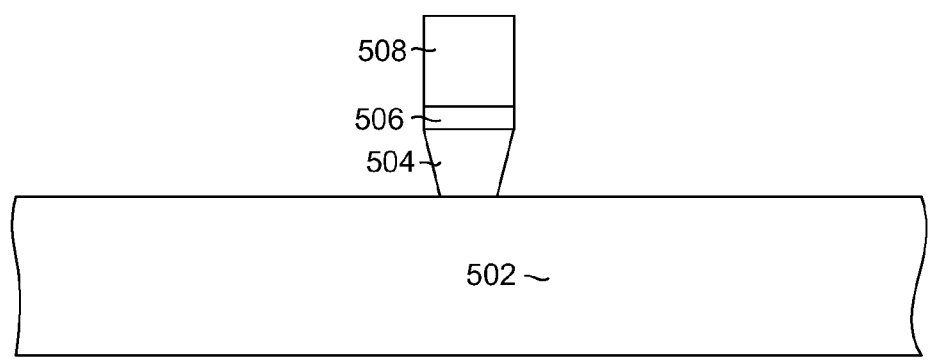

With reference now to FIG. 9, an ion milling is performed to transfer the image of the mask layer 508 onto the underlying bottom hard mask 506 and write pole layers 504, by removing portions of the layers 506, 504 that are not protected by the mask layers 508, 510. The ion milling can be performed at one or more angles relative to normal in order to form tapered side walls as shown in FIG. 9 and to prevent excessive re-deposited material (redep) from forming on the sides of the write pole material 504. The ion milling can also be performed as a sweeping ion milling.

Figure 10:
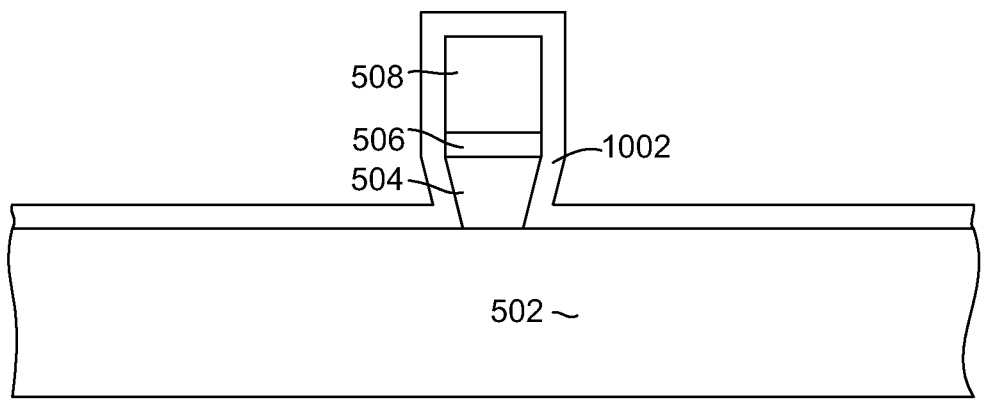

After the write pole 504 has been patterned as shown in FIG. 9, a layer of non-magnetic side gap material 1002 can be deposited as shown in FIG. 10. This layer 1002 can be alumina and can be deposited by a conformal deposition process such as atomic layer deposition to a thickness that is sufficient to define a desired side gap thickness. Then, a directional material removal process such as ion milling can be performed to preferentially remove horizontally disposed portions of the non-magnetic side gap material 1002, leaving non-magnetic side walls 1002 at the sides of the write pole 504 as shown in FIG. 11.

Figure 11:
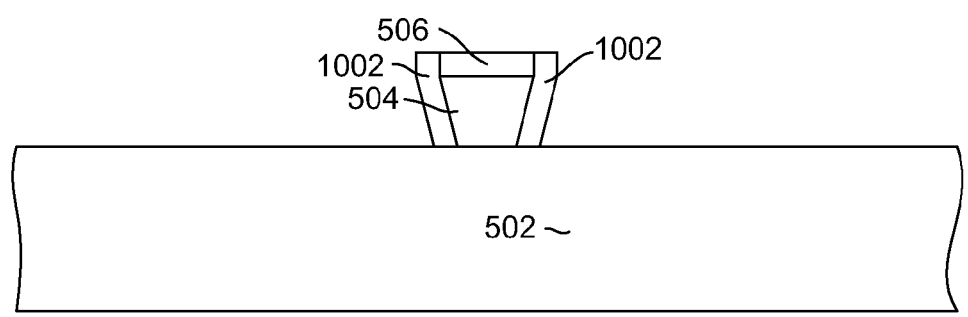
Figure 12:
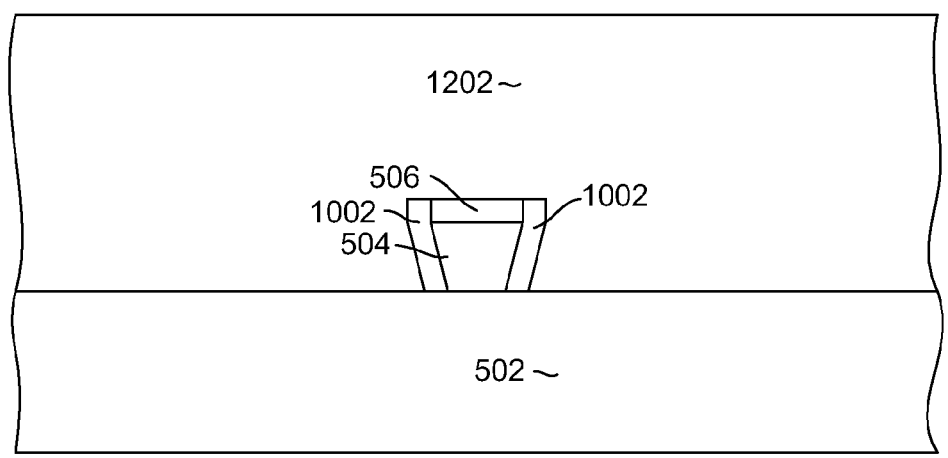

As shown in FIG. 11, the material 1002 provides non-magnetic gap layers at the sides of the write pole 504, and the remaining lower hard mask layer 506 provides a trailing gap layer on top of the write pole (e.g. on the trailing edge of the write pole). Finally, with reference to FIG. 12, a trailing, wrap-around magnetic shield 1202 can be formed by electroplating a magnetic material such as NiFe over the layers 504, 1002, 504, 506.

With the above process having been described above, the advantages of the above described process can be discussed in greater detail. The use of the novel bi-layer upper hard mask 513 (FIG. 5) provides several advantages with regard to reducing the cost of manufacturing, increasing manufacturing throughput, and improving the accuracy of write pole definition.

As those skilled in the art will appreciate, a factor that greatly affects the resolution and accuracy of the photolithographic process used to define a photoresist mask. With reference back to FIG. 6, a photolithographic process is used to pattern and define the photoresist mask 514. This involves projecting light through a lens to define a pattern on the photoresist layer 504 (shown full film in FIG. 5). Either a positive or negative photoresist can be used such that either the portions of layer 514 that are to remain are exposed to light, or the portions that are to be removed are exposed to light. Using a shorter wavelength photoresist allows a shorter wavelength of light to be used to pattern the resist 514, which results in improved resolution. In a stack of mask layers such as shown in FIG. 5, reflection from under-lying layers such as layers 508, 510, 512 affects the patterning of the photoresist mask 514, because the reflected light can interfere with the pre-reflected light from the lens (not shown), either adding to the amplitude of light or cancelling the pre-reflected light. This can result in deformation of the patterning of the photoresist layer 514.

One method that has been used to overcome this problem has been to include a bottom anti-reflective coating (BARC) directly beneath the photoresist layer. This however leads to added expense in having to include the additional BARC material. The use of the BARC layer also increases the manufacturing complexity by requiring an additional reactive ion etching step to transfer the image of the photoresist mask 514 onto the under-lying BARC layer.

Another method that has been proposed to overcome reflectivity problems is to use a silicon containing polymer (SiHM®, Shin-Etsu Chemical Co., Ltd.) beneath the photoresist mask. However, SiHMs are expensive, and therefore, greatly increase manufacturing cost.

Another issue that arises with the use of either a BARC layer or a SiHM is that they make re-work much more difficult. As those skilled in the art will understand, once the photoresist pattern has been patterned, the resulting mask 514 (FIG. 6) is checked for accuracy. If the mask is not within specifications it must be removed and another attempt must be made to form the mask 514. However, if a BARC layer or a SiHM layer is used, these layers are affected by the photolithographic process. This means that if the mask 514 is not within specifications and a re-work needs to be performed, all of underlying mask layers including the BARC or SiHM must be removed and then new layers are re-deposited. This greatly increases manufacturing cycle time and decreases efficiency thus adds extra production cost.

Figure 13:
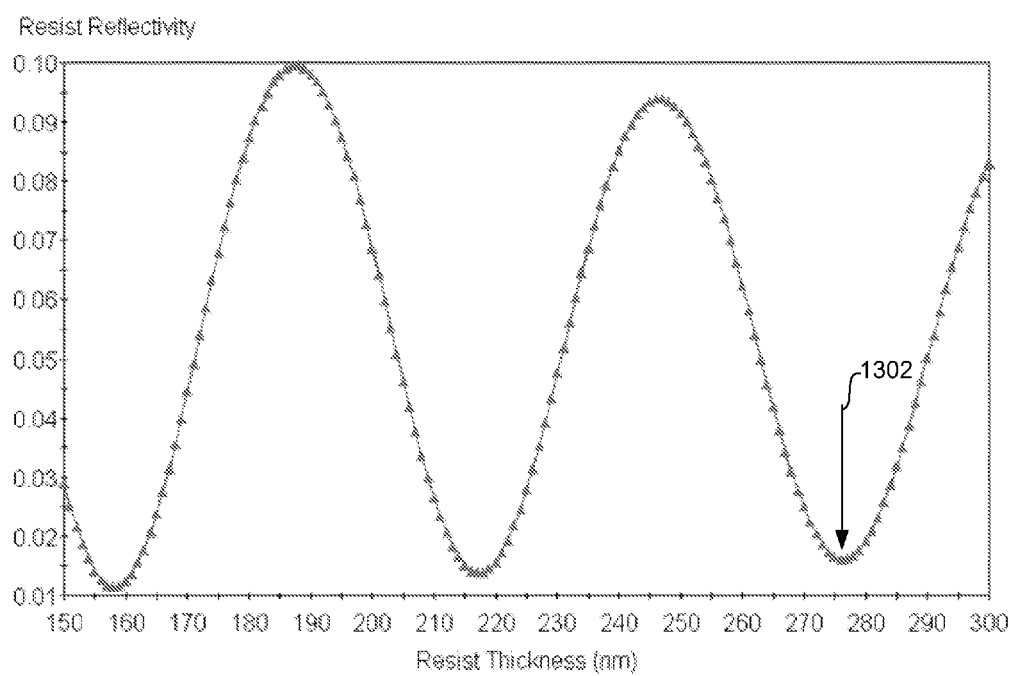
FIG. 13 is a graph showing a reflectivity swing curve for a prior art method of manufacturing a magnetic write head.
Figure 14:
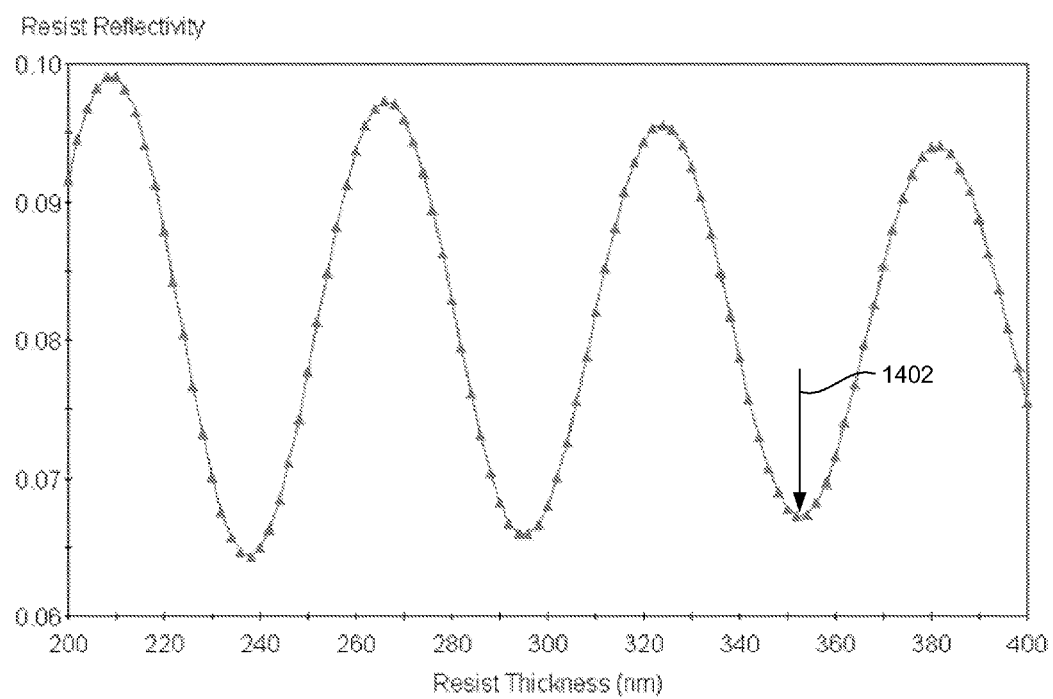
FIG. 14 is a graph showing a reflectivity swing curve for another prior art method of manufacturing a magnetic write head.
Figure 15:
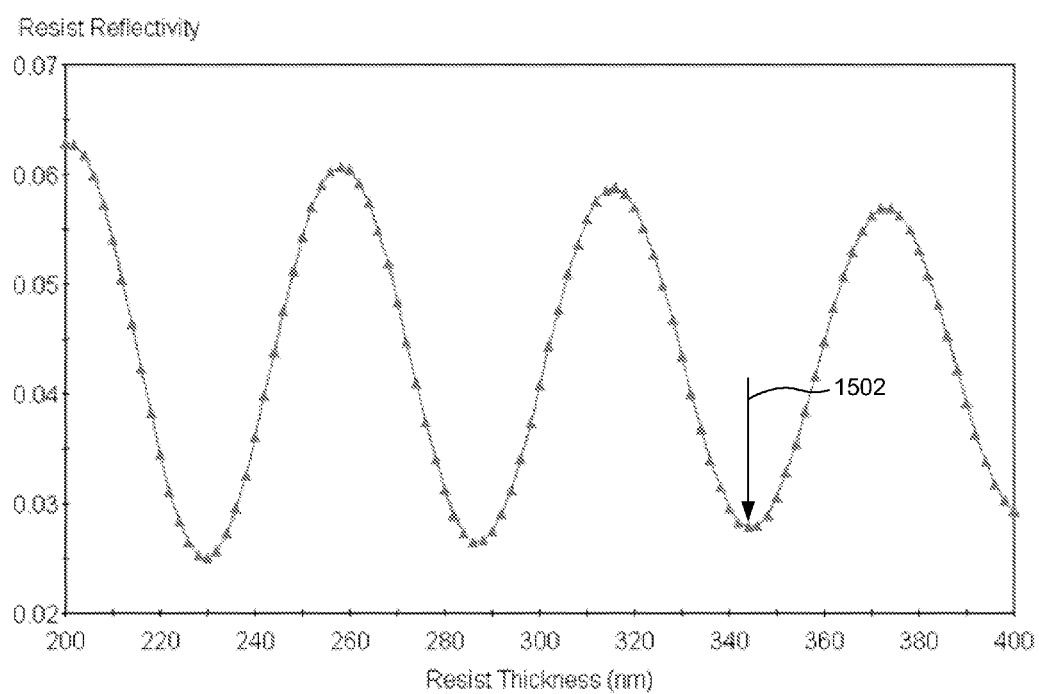
FIG. 15 is a graph showing a reflectivity swing curve for a method of manufacturing a magnetic write head according to the present invention.

The use of the novel bi-layer hard mask 513 (layers 510, and 512) overcomes all of these challenges, allowing an accurate, well defined write pole to be formed at a lower cost and with increased manufacturing throughput. First, the bi-layer mask 513 has excellent reflectivity properties. FIG. 13 shows photoresist reflectivity as a function of photoresist thickness when the photoresist is formed over a bottom anti-reflective layer BARC as described above. The arrow 1302 shows a desirable minimum reflectivity point at a resist thickness of about 276 nm of resist thickness where the reflectivity is about 1.5%, and maximum reflectivity point at a resist thickness of about 250 nm of resist thickness where the reflectivity is about 9.5%. That shows a reflectivity swing between minimum and maximum points of about 8%. FIG. 14 shows a reflectivity curve as a function of photoresist thickness for a photoresist layer formed over a SiHM. The arrow 1402 shows a desirable minimum reflectivity point at a photoresist thickness of about 350 nm where the reflectivity is 6.7% and maximum reflectivity point at a resist thickness of about 325 nm of resist thickness where the reflectivity is about 9.5%. That shows reflectivity swing between minimum and maximum points of about 3%. FIG. 15 shows a reflectivity curve for a photoresist layer formed over a bi-layer hard mask as described above as an embodiment of the present invention. In FIG. 15, arrow 1502 shows a desirable minimum reflectivity point where the photoresist thickness is about 345 nm and having a reflectivity of about 2.7% and maximum reflectivity point at a resist thickness of about 315 nm of resist thickness where the reflectivity is about 5.8%. That shows reflectivity swing between minimum and maximum points of about 3%. As can be seen, this novel bi-layer hard mask's minimum reflectivity is comparable to that achieved using a bottom anti-reflective coating (BARC) and is much better (lower) than that achieved using an expensive SiHM, but also its reflectivity swing between minimum and maximum points is much lower than that achieved using a bottom anti-reflective coating (BARC) and comparable to that achieved using an expensive SiHM and without the additional expense and complexity of using either a BARC layer or a SiHM.

In addition, the bi-layer hard mask structure makes re-work much easier and less expensive. As discussed above, when using a prior art BARC layer SiHM, if the photoresist pattern turned out to be out of spec and it was necessary to rework the photoresist mask, it was necessary to remove and then replace the underlying mask layers including the BARC layer or SiHM. The bi-layer mask structure 513 (FIG. 5) is, however, unaffected by the processes used to photolithographically pattern and develop the photoresist layer 514. This means that if a rework of the photoresist patterning must be done, only the photoresist layer 514 needs to be removed and re-deposited. This simplifies the rework process, saving a great deal of manufacturing time and cost. In addition, the materials of the bi-layer mask 513 (i.e. carbon, and a silicon dielectric (such as silicon oxide, silicon nitride, silicon carbide, silicon oxynitride, poly-silicon or amorphous silicon)) are readily available and inexpensive, which further improves manufacturing simplicity and decreases manufacturing cost.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
    depositing a layer of write pole material;
    depositing a series of mask layers over the write pole material, the series of mask layers comprising:
        an under-layer; a bi-layer hard mask structure formed over the under-layer, the bi-layer hard mask structure further comprising a layer of silicon dielectric and a layer of carbon formed over the layer of silicon dielectric; and a layer of photoresist deposited over the bi-layer hard mask structure;
    photolithographically patterning the photoresist layer to form a photoresist mask;
    performing a reactive ion etching to remove portions of the bi-layer hard mask structure that are not protected by the photoresist mask; and
    performing an ion milling to remove a portion of the magnetic write pole layer that is not protected by the under-layer to define a write pole;
    wherein the layer of carbon is deposited to a thickness of 2-10 nm.

2. The method as in claim 1, further comprising depositing a hard mask layer over the layer of write pole material, before depositing the under-layer.

3. The method as in claim 1 further comprising depositing a layer of alumina over the layer of write pole material before depositing the under-layer.

4. The method as in claim 1 further comprising depositing a layer of carbon over the layer of write pole material before depositing the under-layer.

5. The method as in claim 1 wherein the reactive ion etching is performed using a fluorine based chemistry.

6. The method as in claim 1 wherein the reactive ion etching is performed using a chemistry that includes one or more of $CF_4$, $CHF_3$, $O_2$ and He.

7. The method as in claim 1 wherein the layer of carbon is deposited by spin coating.

8. The method as in claim 1 wherein the layer of carbon is deposited by chemical vapor deposition or plasma enhanced chemical vapor deposition.

9. The method as in claim 1 wherein the layer of carbon is deposited by sputter deposition.

10. The method as in claim 1 wherein the layer of silicon dielectric comprises silicon oxide, silicon nitride, silicon carbide, silicon oxynitride, poly-silicon or amorphous silicon.

11. The method as in claim 1 wherein the layer of silicon dielectric is deposited to a thickness of about 100 nm.

12. The method as in claim 1 wherein the layer of carbon is deposited to a thickness of about 5 nm.

13. A method for manufacturing a magnetic write head, comprising:

depositing a layer of write pole material;

depositing a series of mask layers over the write pole material, the series of mask layers comprising:

an under-layer; a bi-layer hard mask structure formed over the under-layer, the bi-layer hard mask structure further comprising a layer of silicon dielectric and a layer of carbon formed over the layer of silicon dielectric; and a layer of photoresist deposited over the bi-layer hard mask structure;

photolithographically patterning the photoresist layer to form a photoresist mask;

performing a reactive ion etching to remove portions of the bi-layer hard mask structure that are not protected by the photoresist mask; and performing an ion milling to remove a portion of the magnetic write pole layer that is not protected by the under-layer to define a write pole;

wherein the layer of silicon dielectric is deposited to a thickness of 50-150 nm and the layer of carbon is deposited to a thickness of 2-10 nm.

14. The method as in claim 13 wherein the layer of silicon dielectric is deposited to a thickness of about 100 nm and the layer of carbon is deposited to a thickness of about 5 nm.

\* \* \* \* \*